Aug. 7, 1956   R. J. LAPPIN   2,757,386
LITTER
Filed May 17, 1951   2 Sheets-Sheet 1
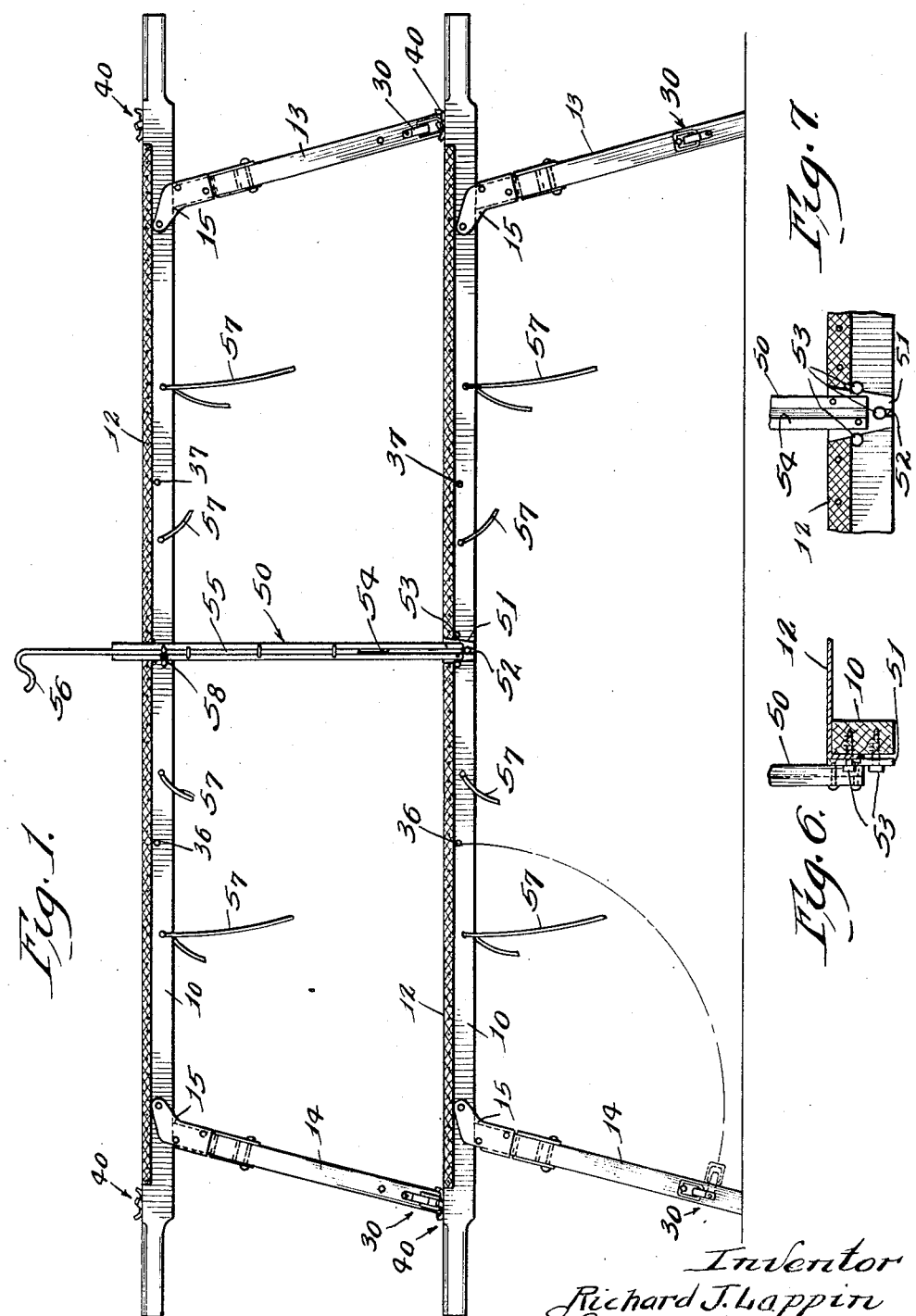

Aug. 7, 1956 R. J. LAPPIN 2,757,386
LITTER
Filed May 17, 1951 2 Sheets-Sheet 2
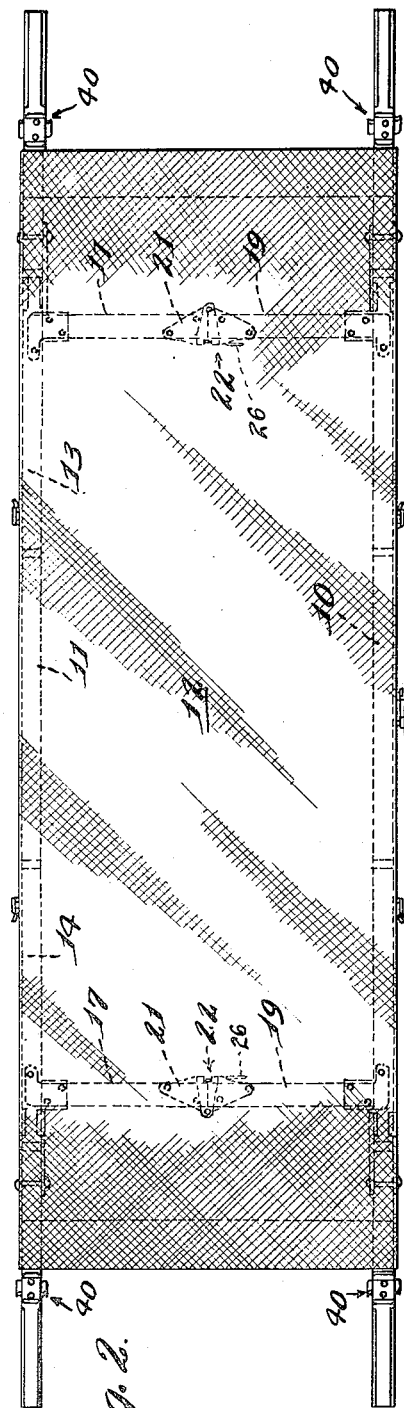
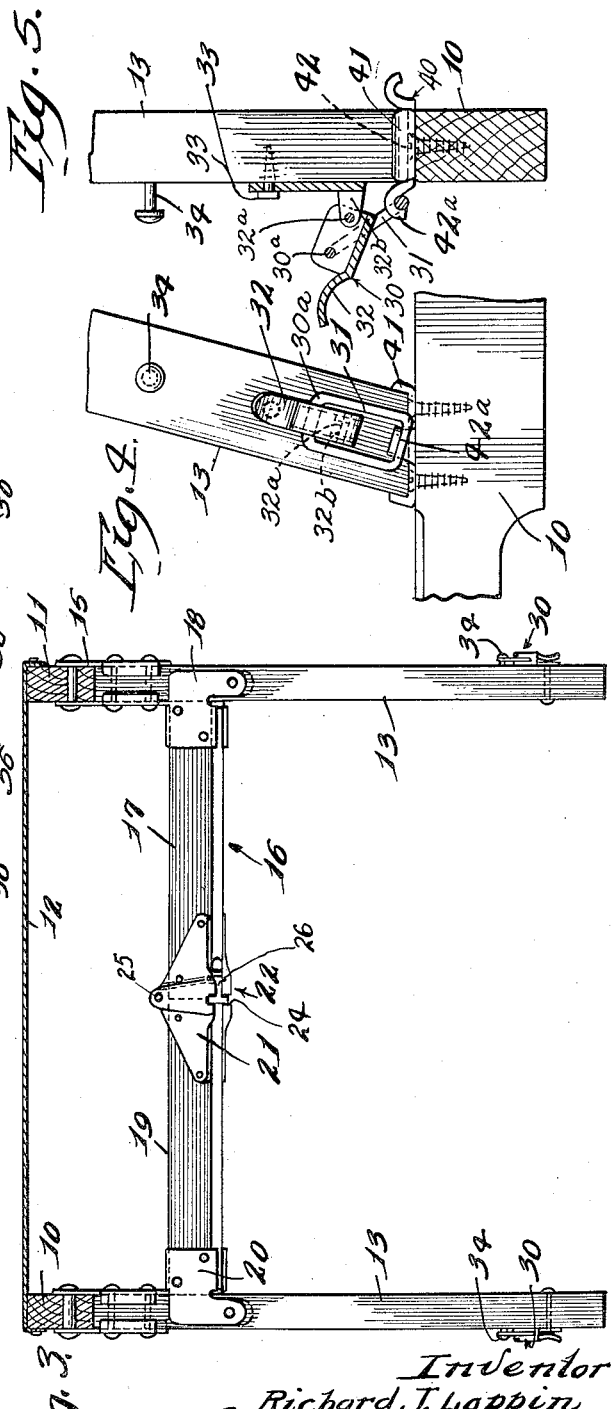
Inventor
Richard J. Lappin
By Schroeder, Merriam,
Hofgren + Brady
Att'ys

United States Patent Office 2,757,386
Patented Aug. 7, 1956

2,757,386

LITTER

Richard J. Lappin, Muskegon, Mich., assignor to The Brunswick-Balke-Collender Company, a corporation of Delaware Application May 17, 1951, Serial No. 226,852

5 Claims. (Cl. 5—8)

This invention relates to a litter and more particularly to a collapsible form of litter construction which may be used in a variety of ways.

It is the general object of this invention to provide a new and improved litter construction.

It is a more specific object of this invention to produce a readily collapsible litter which may be stacked upon other litters of similar construction to produce a multiple bed.

It is a further object of this invention to produce a litter construction so arranged to be used as a litter and provided with folding legs so that it may be used as a cot or bed, and further provided with means whereby one such cot or bed may be stacked upon another to produce a multiple bed for use in hospitals, first aid shelters and the like.

It is a more particular object of the invention to produce a litter of the character described in the preceding paragraph which is readily adaptable for use as a stretcher in medical centers such as first aid stations, and which is usable as a litter, a cot or as a multiple bed in the event of a calamity or catastrophe.

Another object of the invention is to produce a litter having a pair of legs which are pivotally secured thereto for movement between a first position in which the legs lie closely adjacent and parallel to the sides of the litter so as not to interfere with its being used as such, to a second position in which the legs are swung beyond the vertical to hold the bed of the litter above a support so that it may act as a cot and to provide each of the side bars of the litter with brackets adapted to receive the legs of a similarly constructed litter to support the second litter above the first to form a multiple bed.

Yet another object of the invention is to produce a litter of the type described in the preceding paragraph which is provided with a fastening device on each leg, which device may be used either to hold the legs in position parallel to the sides of the litter or firmly to hold the legs in the bracket of a second litter in the event the litters are used in stacked array.

Another object of the invention is to produce a litter or cot having means for supporting medical equipment in raised position above the bed portion thereof.

Other and further objects of the invention will be readily apparent from the following description of the drawings in which:

Fig. 1 is a side elevational view showing two litters of this invention, one stacked upon another;

Fig. 2 is a top plan view of the litter of this invention showing the legs in folded back position;

Fig. 3 is an end view of the litter of this invention showing the legs in extended position;

Figs. 4 and 5 are enlarged detailed views of the fastening device and bracket provided on each leg and on the side bars of the litter respectively with the fastening device shown in cross-section in Fig. 5;

Fig. 6 is a sectional view through the center portion of Fig. 1 showing the details of the medicine carrying post and the manner in which it is attached to the side bars of the litter; and Fig. 7 is a front view of the device shown in Fig. 6.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to Figs. 1, 2 and 3 of the drawings there is shown a litter including a pair of parallel side bars 10 and 11 between which is stretched a canvas bed portion 12, the canvas being secured to the side bars by stitching, stapling or by being formed in a loop through which the side bars extend, as may be desired. A first pair of legs 13 and a second pair of legs 14 are each pivotally secured to opposite ends of the litter by means of the bracket 15. Extending between each pair of legs is a toggle brace 16 which includes a first portion 17 having one end pivotally secured to a leg 13 by a bracket member 18 and a second portion 19 secured to the opposite leg 13 by a bracket 20. The two portions 17 and 19 of the brace are pivotally secured together by means of the bracket 21 and are held in the extended position shown in Fig. 3 by means of a locking device 22. It will be noted that the toggle brace 16 is located a short distance below the top of the legs 13 and when so positioned serves to tie the legs together and to brace them effectively against bending or breakage.

The extension of the toggle brace 16 to the position shown in Fig. 3 serves to stretch the canvas bed portion 12 between the side bars 10 and 11.

Referring now to Figs. 4 and 5, it will be noted that each of the legs in each pair is provided with a fastening device 30 which includes a loop portion 31 and a lever portion 32 which pivots about a pivot pin 32a mounted in ear 32b and which serves to draw the loop 31 toward the body of the fastener as it is depressed. One side 30a of the loop portion 31 is loosely mounted in the lever portion 32. Thus, in fact, the lever means or portion 32 serves as a tightening device to tighten the loop against a member with which it is engaged. The arrangement of pivot pin 32a and the mounting position for side 30a of the loop 31 effects an over-center locking action when the loop is tightened against a member with which it is engaged. Each fastener 30 is freely swingably mounted upon a pin 33 fixed in each of the legs so that it may be swung to the position shown in Fig. 3 wherein the loop portion may be engaged with a pin 34 fixed to each leg above the fastening device. In this position the fastening device is out of the way and does not interfere or catch on the floor or other support upon which the litter may be resting when the legs are extended.

Each pair of legs 13 and 14 may be pivoted from the extended position shown in Figs. 1 and 3 through an angle of over 90° to the position shown in Fig. 2 wherein the legs lie parallel to and closely adjacent the side bars 10 and 11. With the legs in this position the device acts as a litter or stretcher and may be used to carry a patient from place to place as desired.

It will be noted that the side bars 10 and 11 are provided with pins 36 and 37 which may be engaged by the loops 31 of each fastening device when the legs are swung to the upward position shown in Fig. 2 and when in this position each of the fastening devices 30 serves to hold the legs in the upward position against the lower portion of the side bars. When it is desired to convert the litter into a cot, the fasteners 30 need only be unhooked from the pins 36 and 37 and the legs swung down beyond the vertical to their extended position. It will be realized, of course, that inasmuch as the legs are swung beyond the vertical when they are extended no means need be provided for maintaining the legs in extended position as the weight of the litter and the patient serves effectively to prevent their collapse.

Referring now to Fig. 1 it will be noted that each of the side bars is provided adjacent its outer end with a bracket 40 which is so designed as to receive a leg of a similarly constructed litter so that one litter may be stacked upon another as shown in Fig. 1 to form a multiple bed construction. To this end, each of the brackets 40 is provided with sides 41 which extend upwardly from the flat center portion 42 of the bracket so as to provide an open-top enclosure for each leg. When a leg has been inserted in its corresponding bracket the loop portion 31 of the fastening device 30 may be released from the pin 34, the fastening device swung about the pin 33 until it extends downwardly toward the bracket and the loop 31 then hooked in a hook portion 42a provided on each bracket. When the lever 32 is swung upwardly the loop is tightened against the hook firmly to hold each leg in its bracket.

When used as a cot or as a multiple bed, means are provided on each litter for supporting medical equipment as for example, a bottle of blood plasma, an antibiotic solution, or the like. As best shown in Figs. 1, 6 and 7 the means include a post 50 provided with a substantially triangularly shaped bracket 51 at its lower end, the bracket having a notch 52 along its lower edge to fit in the lowermost of three pins 53 provided at substantially the center of each side bar. The post is provided with a substantially U-shaped channel 54 which slidably receives a rod 55 provided with a hook portion 56 at its upper end from which medical equipment may be supported. A wing nut 58 is provided to clamp the rod at any one of a number of positions within the channel 54 so that the same may be raised and lowered as desired. A number of thongs 57 are secured to each side bar and may be used to hold the post 50 and its attending equipment against and parallel to a side bar when not in use.

The particular fastening device 22 illustrated, permits a positive locking of the toggle brace 16 in extended position. The brackets 21 are actually leaf portions of the hinge joining the portions 17 and 19 of the brace. The leaf portions are provided with similar notches 24 in the sides thereof opposite the hinge pin 25 which come into registry transversely of the toggle brace when the latter is extended. The ears of a latch plate 26 may be received in the registered notches to lock the sections together and a spring (not shown) under the latch plate urges and keeps the ears in the notches. The portions of the toggle brace may only fold by removing the ears of the latch plate out of the notches in the hinge plates thus providing a positive lock.

From the construction illustrated it can be seen that the litter is readily foldable by pivoting the legs to the position shown in Fig. 2, unfastening the device 22 to permit the toggle braces 16 to be folded toward each other which of course brings the side bars together in close abutting relationship. The canvas bed portion may then be wrapped around the side bars and the longer of the thongs may be used to hold the litter in its folded position when the litter itself is in storage.

I claim:

1. A multiple bed comprising at least two litters; each litter having side bars and legs attached thereto for pivotal movement from a position closely adjacent and parallel to the side bars to an extended supporting position, means on each litter for stacking litters upon one another to produce a multiple bed device comprising a plurality of brackets mounted at the outer ends of each side bar, each bracket having a hook and means for receiving the base of a litter leg disposed thereabove, a fastening device swingably attached to each leg and including a loop engageable with the hook of a bracket disposed therebeneath and lever means for tightening the loop against the hook, a pin on each leg above the fastening device and pins on each side bar whereby the legs may be held in the first mentioned position by engagement of each loop with its respective pin on the side bars and whereby said fastening devices may be swung to a noninterfering position and held therein by engagement of the loops and the pins on the legs.

2. A stackable litter comprising a pair of elongated side bars, a fabric bed portion secured to the side bars, a pair of legs attached to the side bars adjacent each end thereof for pivotal movement from a position closely adjacent and parallel to the side bars to a downwardly extending position to support the side bars in elevated position, a pair of toggle braces hinged in substantially the middle, one of the toggle braces being connected to the legs in each pair for holding the legs apart and stretching the fabric between the side bars, said toggle braces having notches which overlie each other when the toggle braces are extended, a positive locking member mounted on said braces and engageable within said notches, and a fastening device on each leg whereby a plurality of litters may be stacked upon each other with the legs on an upper litter being placed on the next lower litter and held thereon by the fastening devices.

3. A stacked array of litters comprising at least two litters; each litter having a pair of elongated side bars, a fabric bed portion secured to the side bars, two pairs of legs pivotally attached to the side bars, one of said pairs of legs being attached adjacent each end of said side bars for pivotal movement from a position closely adjacent and parallel to the side bars to a position beyond the vertical to support the side bars in elevated position, a toggle brace connected between the legs of each pair for holding the legs and side bars in extended position in either of said leg positions to stretch the fabric bed portion, a plurality of brackets each having a hook portion and means for receiving the base of an adjacent litter leg disposed thereabove, one of said brackets being mounted on each side bar adjacent the outer ends thereof, a fastening device on each leg adjacent the lower end thereof including a loop portion engageable with the hook portion of an adjacent leg receiving bracket on the litter disposed therebeneath and lever means for tightening said loop portion to said hook portion to hold the litters securely together, and a plurality of pins on said side bars positioned for engagement by the loop portion of the fastening device on each leg to hold said legs in their position wherein said legs are parallel to the side bars, there being one pin associated with each fastening device.

4. A stacked array of litters comprising at least two litters; each litter having a pair of elongated side bars, a fabric bed portion secured to the side bars, two pairs of legs pivotally attached to the side bars, one of said pairs of legs being attached adjacent each end of said side bars for pivotal movement from a position closely adjacent and parallel to the side bars to a position beyond the vertical to support the side bars in elevated position, means connected between the legs of each pair for holding the legs and side bars in extended position in either of said leg positions to stretch the fabric bed portion, means having a hook portion mounted on each side bar adjacent the outer ends thereof, a fastening device on each leg including a loop portion engageable with the corresponding hook portion on the litter disposed therebeneath and lever means for tightening said loop portion to said hook portion to hold the litters securely together.

5. A stackable litter suitable for use in a set of stacked vertical litters and connection with duplicate litters disposed above and beneath thereof, comprising, a pair of elongated side bars, a fabric bed portion secured to the side bars, two pairs of legs pivotally attached to the side bars one of said pairs being attached adjacent each end thereof for pivotal movement from a position closely adjacent and parallel the side bars to a position beyond the vertical to support the side bars in elevated position, a toggle brace connected between the legs of each pair for holding the legs and side bars in extended position to stretch the fabric bed portion in either of said leg positions, a bracket having a hook portion mounted on each side bar adjacent the outer ends thereof and having means adapted to receive the base of an adjacent litter leg disposed thereabove, and a fastening device on each leg having a loop portion adapted for engagement with the corresponding hook portion of a litter disposed therebeneath to hold the litters together, and pins on said side bars positioned for engagement by the loop portion of the fastening device on each leg to hold said legs in the position wherein the legs are parallel to the side bars.

References Cited in the file of this patent

UNITED STATES PATENTS

| Number | Name | Date |
|---|---|---|
| 7,791 | Zaiser | Nov. 19, 1850 |
| 455,193 | Fortiner | June 30, 1891 |
| 1,130,122 | Tomassi | Mar. 2, 1915 |
| 1,219,158 | Rose | Mar. 13, 1917 |
| 1,261,611 | Polyak | Apr. 2, 1918 |
| 1,286,328 | Hubbard | Dec. 3, 1918 |
| 1,339,174 | Duggan | May 4, 1920 |
| 1,631,621 | Carrigan | June 7, 1927 |
| 1,974,233 | Burke | Sept. 18, 1934 |
| 2,363,599 | Kurth | Nov. 28, 1944 |
| 2,640,996 | Davis | June 9, 1953 |

FOREIGN PATENTS

| Number | Country | Date |
|---|---|---|
| 4,111 | Great Britain | 1890 |
| 987,562 | France | Apr. 18, 1951 |